US005122813A

United States Patent [19]

Lass et al.

[11] Patent Number: 5,122,813

[45] Date of Patent: Jun. 16, 1992

[54] METHOD OF MAKING A MULTILAYER IDENTIFICATION CARD USABLE AS A PRINTING BLOCK

[75] Inventors: Joseph Lass; Hansjurgen Merkle, both of Munich; Alexander Hierweger, Rottach-Egern; Erwin Lob, Munich, all of Fed. Rep. of Germany

[73] Assignee: GAO Gesellschaft fur Automation und Organisation mbH., Fed. Rep. of Germany

[21] Appl. No.: 642,886

[22] Filed: Jan. 18, 1991

Related U.S. Application Data

[62] Division of Ser. No. 246,638, Sep. 20, 1988.

[30] Foreign Application Priority Data

Sep. 22, 1987 [DE] Fed. Rep. of Germany ....... 3731853

[51] Int. Cl.[5] ........................ G01D 9/00; G01D 15/14; B42D 15/10; B42D 15/00

[52] U.S. Cl. .................................. 346/1.1; 346/76 L; 283/904; 283/85; 283/67

[58] Field of Search ................ 346/1.1, 76 L; 101/32; 283/904, 67, 72, 74, 75, 85, 93, 94, 109, 107

[56] References Cited

U.S. PATENT DOCUMENTS

| | | | |
|---|---|---|---|
| 4,006,060 | 2/1977 | Hurst et al. | 283/94 |
| 4,507,346 | 3/1985 | Maurer et al. | 428/158 |
| 4,544,183 | 10/1985 | Parkinson | 283/904 |
| 4,557,963 | 12/1985 | Caines | 283/904 |
| 4,579,754 | 4/1986 | Maurer et al. | 428/29 |
| 4,596,409 | 6/1986 | Holbein et al. | 283/85 |
| 4,597,592 | 7/1986 | Maurer et al. | 283/75 |
| 4,597,593 | 7/1986 | Maurer | 283/91 |
| 4,672,891 | 6/1987 | Maurer et al. | 101/32 |
| 4,748,452 | 5/1988 | Maurer | 346/1.1 |
| 4,765,656 | 8/1988 | Becker et al. | 283/70 |
| 4,766,026 | 8/1988 | Lass et al. | 428/203 |
| 4,849,618 | 7/1989 | Namikawa et al. | 283/904 |

FOREIGN PATENT DOCUMENTS

| | | | |
|---|---|---|---|
| 0308904A2 | 3/1989 | European Pat. Off. | 283/904 |
| 2223290 | 4/1973 | Fed. Rep. of Germany . | |

*Primary Examiner*—Benjamin R. Fuller
*Assistant Examiner*—David Yockey
*Attorney, Agent, or Firm*—Bacon & Thomas

[57] ABSTRACT

An identity card is provided with a character set usable as a printing block, whereby the "natural foamability" that laser action brings about in the plastic materials commonly used for identity cards, such as PVC and polycarbonate, is exploited to obtain a relief height sufficient for a clear impression of the characters. The standard total height of the embossed characters relative to the rest of the card surface is reached by an additional deformation of the card body in the embossed character area so as to form flat plateaus underlying the characters.

13 Claims, 4 Drawing Sheets

METHOD OF MAKING A MULTILAYER IDENTIFICATION CARD USABLE AS A PRINTING BLOCK

This application is a division, of application Ser. No. 07/246,638, filed Sep. 20, 1988.

BACKGROUND OF THE INVENTION

1. Field of the Invention

The present invention relates to a multilayer identity card comprising at least one card surface made of plastic which has in part of its area characters or symbols in a relief structure usable as a printing block, and to a method of producing such identity cards.

2. Discussion of Known Art

Identity cards in the form of credit cards, bank cards, cash cards, entitlement cards or the like are used in a great variety of areas, for example cashless transfers, admittance control systems and a great variety of service systems. These identity cards generally have data related to the card owner which are applied during the so-called "personalization process." A widespread form of representing these characters is embossing, by which the user-related data are embossed from the back of the identity card to the front of the card in relief. To make the individual characters more visible, one dyes them in the peak areas additionally.

However, this financially advantageous form of personalization has the disadvantage that the user-related data are relatively easy to forge. Since the card materials are generally thermoplastics, in particular PVC, the embossed data can be ironed flat or embossed back relatively easily by a manipulator and the cards reembossed with other data. The original dye can be removed using commercially available solvents without any great difficulty and a forged card redyed with a different set of data. It has also turned out that this dye gradually rubs off during daily use. This not only further facilitates forgoing but also often greatly restricts the readability of the data.

In spite of these considerable shortcomings, this form of personalization is used quite widely, in particular for credit cards, since the character set usable as a printing block allows the data to be transferred easily from the card to the current voucher. This is done using so-called "imprinters" into which the card and the voucher are inserted. Via a mechanical embossing process the user data are transferred to the voucher using carbon paper or flimsy (German patent no. 20 18 927). An international standard lays down, among other things, the position of the embossed data on the indentity card and their form and relief height (ISO Standards 7811/1 and 7811/3).

In particular because of the high risk of forgery with these embossed data, proposals have been made for protecting the embossed characters from being changed by taking additional steps (U.S. Pat. Nos. 4,597,592; 4,672,891; 4,597,593 and 4,748,452).

Other developments have attemped to use other techniques to produce characters which are also usable as a printing block but cannot be simply forged.

For example, German laid-open print no. 22 23 290 discloses a method by which the embossed data appear only on one card surface. This method involves embossing the personalization data into metal plates and transferring them to the card surface during lamination of the indentity card. During the laminating process the card material softens and flows into the depressions in the metal plate without leaving a negative relief on the back. This gives rise to relief embossing without any possibility of embossing back the characters.

However, this method is much more elaborate than the usual embossing method since a metal plate with the appropriately engraved personalization data must be produced for each card and this personalization process is a method step that cannot be separated from the card production.

U.S. Pat. No. 4,507,346 was the first to present an identity card and a method of making it by which identity cards can not only be provided in a simple way with characters usable as a printing block, but these charaters are also present in an especially forgery-proof form. This method proposes providing the indentity card with a foamable plastic layer containing appropriate foaming agents. This layer is then formed locally to form the desired characters in a relief structure. A laser beam is preferably used for this purpose which generates in this foamable plastic material the heat necessary for triggering the foaming process or activating the foaming agents. By appropriate selection of the plastic material, the foaming agent and the laser parameters, such as intensity, etc., this foaming process can be performed selectively to produce characters that conform with the standards in terms of their dimensions and their relief height. At the same time this foaming can involve a dyeing of the plastic material, so that the previously necessary dyeing process can be omitted. Since the dyeing takes place in the plastic material itself and is also irreversible, it is forgery-proof and resistant to abrasion.

In order to obtain the relief height of 0.48 or 0.46 mm above the card surface as required by the standard (ISO Standard 7811/1), one must use special plastic films mixed with appropriate foaming agents. Although plastics and foaming agents suitable for this purpose are known, the necessity of incorporating such plastic layers can in some cases means that certain card structures required for other reasons cannot be realized or, for example, the desired transparency is not obtained due to the foaming agents' own color.

The invention is therefore based on the problem of providing an identity card that allows for the simple but forgery-proof individual mode of writing in particular by the laser method, but which can also be provided with a standard embossed character set without using special foamable films.

BRIEF SUMMARY OF THE INVENTION

The invention is based on the idea of exploiting the "natural foamability" that laser action brings about in the plastic materials commonly used for identity cards, such as PVC and polycarbonate, to obtain a relief height sufficient for a clear impression of the characters and to realize the total height of the embossed characters above the rest of the card surface as required by the standard by an additional deformation of the card body in the embossed character area.

As known from U.S. Pat. No. 4,579,754, the action of a laser beam with appropriate intensity gives rise, in a plastic material sensitive or sensitized to the laser beam, to gas bubbles and fine block dots which lead not only to a discoloration of the material but also increase the volume of the plastic material (this side effect was left out of consideration in the aforesaid publication).

In the present invention this increase in volume arising from the gas bubbles is exploited selectively to produce characters which are distinct from their surroundings not only in terms of their color but also in terms of their relief height. As tests have shown, plastic material such as PVC can increase its volume by 30% and more due to the action of a laser beam even without additional foaming agents, and without a substantial loss of strength in the film in these areas.

By appropriately optimizing the material parameters and method parameters (plastic material, layer structure, layer thickness, laser intensity, beam control, etc.), one can thus produce characters in a relief height sufficient for an impression, whereby the surface is affected only imperceptibly in the character area and is in particular still completely self-contained. Particularly the latter feature is important for the quality of the subsequent impression of the data. Only at very high intensities does the formation of gas bubbles lead to bursts in the cover film, as known from the aforesaid German patent.

It must be noted that—in order to obtain a good impression of the relief characters—the effective maximum height of the character compared to its immediate surroundings need not necessarily be the 0.46 mm laid down by the standard. For a mechanical print of relief characters, a relief height of about 100μ is basically quite sufficient. The relief height is obtained 152 writing, chiefly by an appropriate increase in volume in the transparent cover film of the identity card, while the relief height above the card surface lacking in terms of the standard (360μ) is produced by deforming the card so as to form plateaus.

A double-layer transparent cover film is preferably used for the inventive identity card, the plastic material used for the outer layer being somewhat less sensitive to the laser action. This means that the outer film softens but the bubble formation is somewhat smaller than in the more sensitive inner film. The outer film can then give way to the inner pressure arising from the bubble formation, also contributing itself to increasing the volume, but is subjected to somewhat less thermal stress in view of a good surface quality.

The plateaus on which these characters are formed by the laser can cover a large area, e.g. the area of one or more lines of characters. They can also be composed of a plurality of smaller plateaus each offering room for only one character.

The plateaus can be formed by different methods, e.g. mechanical embossing, thermal embossing or embossing of the card material with simultaneous softening of the material by means of a high-frequency electromagnetic alternating field. The latter method has the advantage that appropriate design of the electrodes, which at the same time form the stamp die, allows the card to be subjected to thermal stress only in the areas that are actually deformed. As shown below, this fact can also be exploited to carry out the plateau formation following the laser writing.

An essential advantage of the present invention is that the conventional materials known from card production can be used for building up the card, whereby one must only heed the layer thicknesses necessary for reaching a sufficient relief height.

Furthermore, the characters applied in this way in the plastic material are extremely safe from falsification since both the increase in volume and the simultaneous discoloration (blackening), which can extend all the way to the opaque card core, are irreversible changes in the plastic material. Such characters cannot be formed back either chemically or mechanically once they are produced.

Also, the card production process and the personalization process are two completely independent method steps. Personalization can thus constitute the last working step in producing the identity cards. An essential advantage of this fact is, for example, that "reject cards" obtained in card production can already be eliminated before the personalization process, or that personalized cards are no longer endangered by subsequent production steps.

The relief structures obtained by the natural "foamability" of the plastic material also have sufficient strength, which is necessary for the frequent subsequent use in the imprinters mentioned at the outset for copying the user-related data.

The proposed card structure with the transparent doublelayer cover film also allows other authenticity features, such as the "laser tilt image" known from U.S. Pat. No. 4,765,656, or the "parallax image" known from U.S. Pat. No. 4,766,026, to be applied by means of the laser.

Furthermore, one can produce not only writing with the relief structure but also writing without a relief structure, whereby the laser beam must be appropriately controlled in its intensity and in the scanning speed in a way to be explained below. This makes it possible to write on the identity card also in the area, for exmple, where the magnetic stripe is normally disposed on the back. Writing with a relief structure would have an adverse effect here on readability of the magnetic data since transport rolls disposed in this area impair smooth card transport.

BRIEF DESCRIPTION OF THE DRAWINGS

Further advantages and developments of the invention can be found in the subclaims and the following exemplary embodiments, which shall be explained with reference to the drawings, in which

DETAILED DESCRIPTION OF PREFERRED EMBODIMENTS

Figure 1:
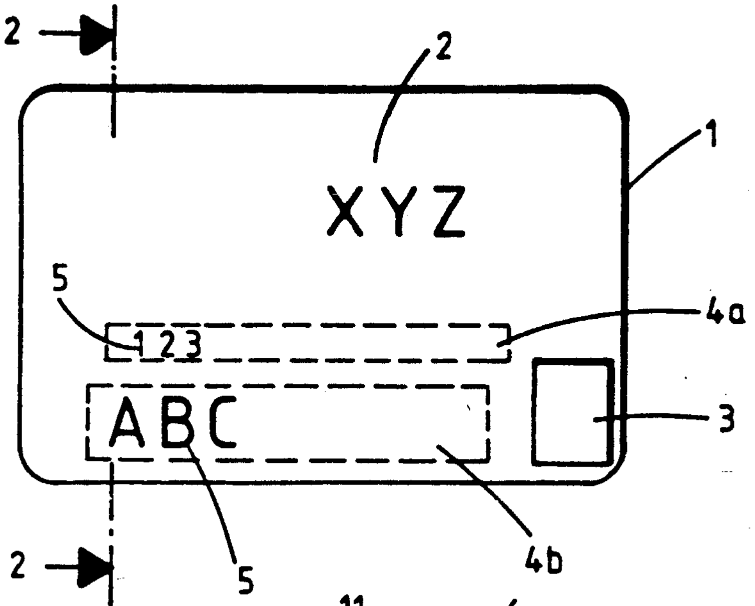
Fig. 1 PRIOR ART
FIG. 1 shows a front view of an identity card provided with embossed characters by a known method.
Figure 2:
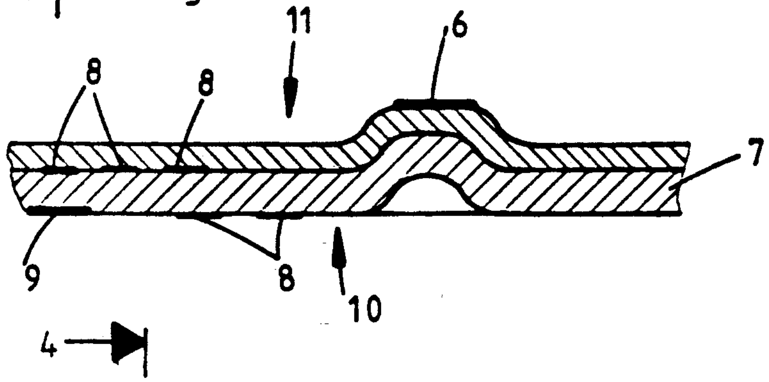
Fig. 2 PRIOR ART
FIG. 2 shows the same card in a cross-sectional view.

FIGS. 1 and 2 show an exemplary identity card 1, such as a credit card, with its typical information content. This is, for example, the name of the issuing credit institution 2, which may be applied by printing techniques to the card inlay. The card also has an authenticity feature 3, such as a hologram embedded in the cover film or glued on. Areas 4*a* and 4*b* of the card are reserved in accordance with the international standard for embossed characters 5, which are usually applied in three or four lines in area 4*b* (for the sake of simplicity only one line is shown in the drawing). After production of the card, i.e. after the various card layers are welded together, these characters are embossed in an appropriate embossing press. To improve their visibility. the characters are then also dyed in their elevated areas, i.e. in peak areas 6.

FIG. 2 shows the card in a cross-sectional view with a two-layer structure, shown here by way of example. An opaque card core 7 bears, for example, on one or both sides a printed pattern 8 and has on its back a magnetic stripe 9. A recess in the card core may house, among other things, an electrical circuit (not shown in the drawing). Embossed characters 5 were applied by pressure into the back and appropriate deformation of the card body, the card being deformed in accordance with the standard so that peak areas 6 reach a height H of about 0.45 mm above the card surface.

As already mentioned in the introduction, these known cards have the disadvantage that the embossing can be undone by appropriate back embossing of the characters and the same card then reembossed with different data. It is also no problem for the forger to remove and reapply the dye since the discoloration can be removed by simple solvents.

Figure 3:
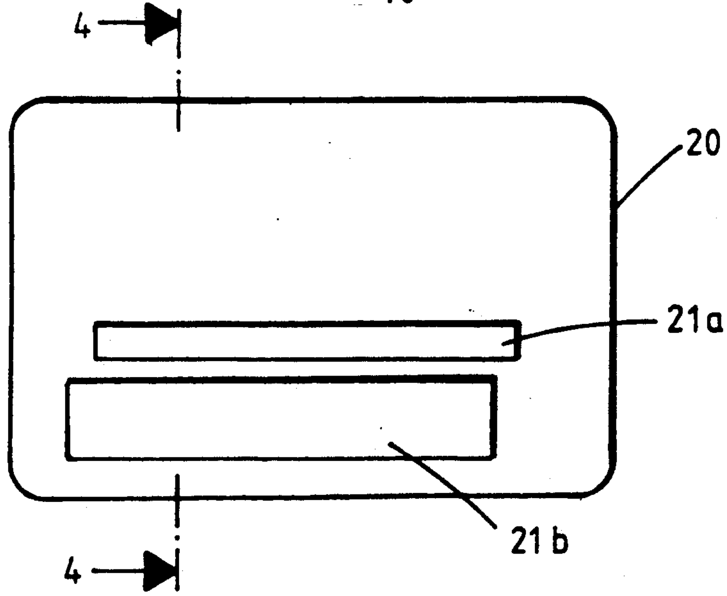
FIG. 3 shows an inventive identity card prior to personalization.

FIG. 3 shows semifinished product 20 for an inventive card prior to personalization. In a preferred embodiment the indentity card is also embossed, but this embossing does not apply the characters themselves but only raises areas 21*a, b*, where the embossed characters are to be applied, uniformly $\approx$0.35 mm above the card surface. The areas marked in FIG. 3 by nos. 21*a* and 21*b* will be referred to in the following as plateaus. They can, for example, have the size of a line or of a field comprising a plurality of lines. These plateaus serve to reach the effective relief height of the embossed characters of 0.45 mm required altogether by the standard.

Figure 4:
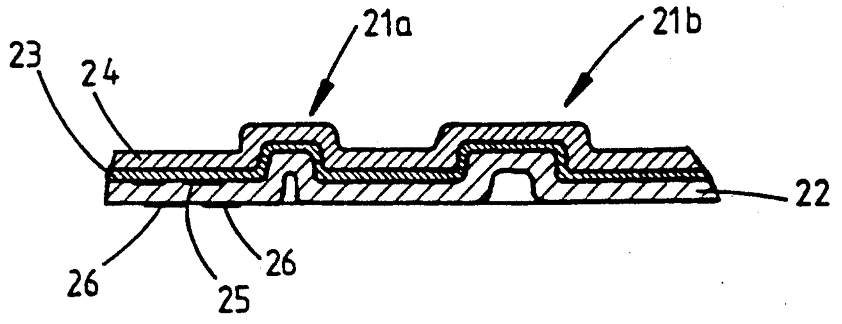
FIG. 4 shows the same card in a cross-sectional view.

FIG. 4 shows semifinished product 20 for the identity card in a cross-sectional view. In the preferred embodiment shown, the inventive card has a three-layer structure. These three layers 22–24 are opaque core layer 22 and a two-layer transparent cover layer 23, 24. The core layer can, as already stated above, be provided on one or both sides with printed patterns 25, 26 and also bear other security features, such as a security thread, watermark-type effects or other features serving to protect the card structure from forgery. This opaque core layer 22 is covered on one side by a one-layer, but preferably two-layer, transparent cover film whose material is selected to be suitable for laser writing. The two-layer cover film consists of two transparent PVC layers 23, 24 which have better absorption ability than the core layer with respect to the laser beam. Such films are known, for example, from the above-mentioned publications U.S. Pat. No. 4,579,754 and U.S. Pat. No. 4,766,026. For inner cover film 23 a film is selected which is more sensitized to the laser beam than outer cover film 24. This structure makes it possible to meet satisfactorily the requirements of a maximum increase in volume while simultaneously maintaining the surface quality of the card. This card can be completely finished, i.e. printed, laminated and embossed, so that the necessary data need only be introduced as the last working step during personalization. The card can of course also be covered on the back with a transparent cover film, provided with a magnetic stripe and/or an integrated circuit.

Figure 5:
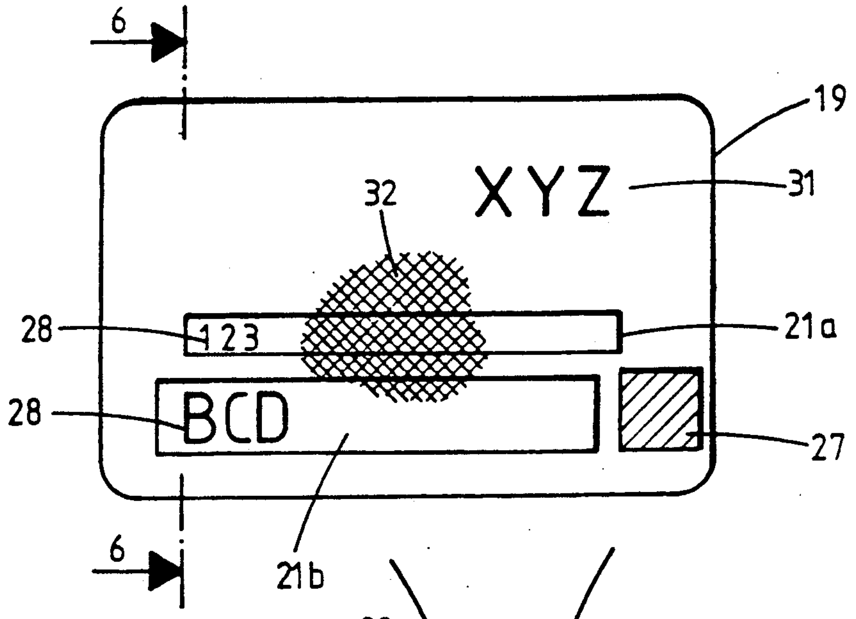
FIG. 5 shows an inventive identity card after personalization.
Figure 6:
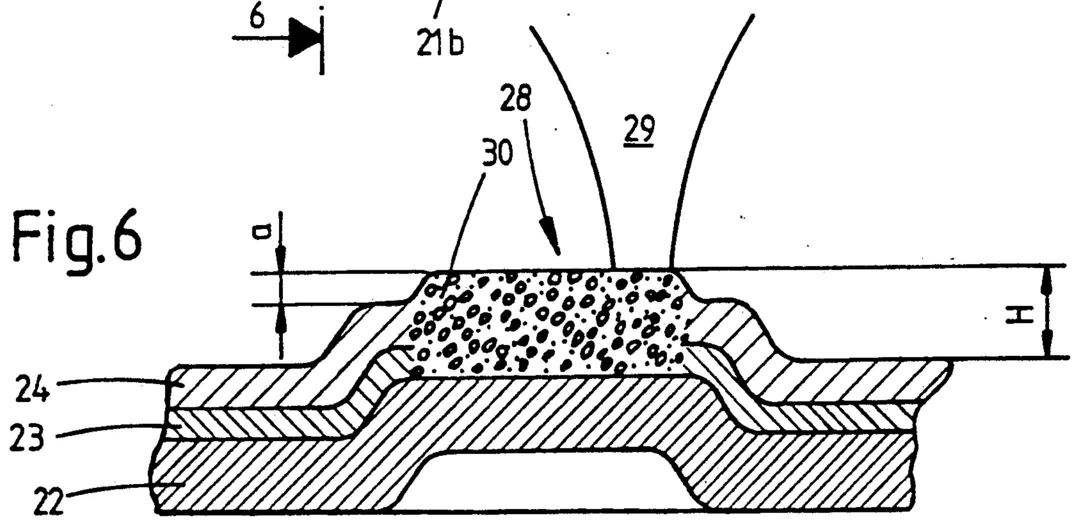
FIG. 6 shows the same card in a cross-sectional view.

In a personalization unit the data to be applied by the laser are applied to the card, embossed characters 28 being recorded in plateau area 21 (FIGS. 5, 6). Laser beam 29 is guided appropriately over these plateaus 21*a, b* of card 19 to form the characters by local expansion of the laser irradiated area the recording parameters such as intensity, scanning speed, pulse frequency, etc., being selected so as to produce maximum bubble formation 30 while simulaneously softening the film without any great bursts or marked craters forming in the surface area. In order to determine the necessary intensity, one can record a so-called "gray key" in a test pass and then use it to determine empirically the particular optimal laser parameters.

For inner cover film 23 a layer thickness of 100 to 150μ is preferably selected, and for outer cover film 24 a thickness of 150 to 200μ. This transparent cover film with a total thickness of 250 to 350μ can be expanded by appropriate laser action to a thickness of 350 or 450μ. Due to the local limitation of the "foaming" area, an increase in volume of about 30% is reflected more or less directly in a corresponding change in thickness. This expansion (a) by about 100μ reached by the laser action yields, together with the plateau formation ($\approx$0.36 mm) produced by the mechanical embossing, height H of 0.46 mm above the rest of the card surface as required by the standard. Tests on the use of this card as a printing block in customary imprinters have shown excellent printing quality.

The relief formation can be optimized additionally be appropriate laser beam control. For this purpose the laser in pulsed-mode operation is directed over the card surface in such a way that the successive pulses overlap locally. The action of the laser beam on the material is thus increased at constant intensity since each following pulse hits material that is already partly blackened and thus more absorbent.

The same card structure also allows for writing on the identity card without simultaneous formation of a relief. In this case, one must make sure the laser beam is reduced in its intensity and the recording preferably effected without overlapping of the individual laser pulses so that—as known from U.S. Pat. No. 4,766,026—only blackening takes place in the more sensitive inner cover layer and substantially no visible bubble formation. This mode of writing is suitable in particular for writing on that area of the card where the magnetic stripe is located on the back, since here a surface smooth on both sides is necessary for scanning the magnetic stripe. This generally applies to the name of the institution 31.

The data are preferably recorded by scanning the card surface in accordance with a dot or line matrix, the laser beam being directed line by line over the card and the character being produced by appropriate brightening and dimming of the laser beam at the corresponding matrix dots. Depending on the type of writing—with or without relief—the laser beam intensity and/or the pulse overlapping is selected.

Card 19 shown in FIG. 5 further has a visually testable authenticity feature 27 which is also produced by a laser and whose appearance can change in accordance with the viewing angle. Such authenticity features are known from the U.S. Pat. Nos. 4,765,656 and 4,766,026, the disclosure of which is here incorporated by reference. This demonstrates the versatility of laser writing, which makes it possible—with the same card structure—to apply data both without relief and with relief as well as appropriate visual authenticity features by simply changing the laser control or laser intensity, optionally in conjunction with partial embossing (plateau, lenticular screen) of the card.

Figure 7:
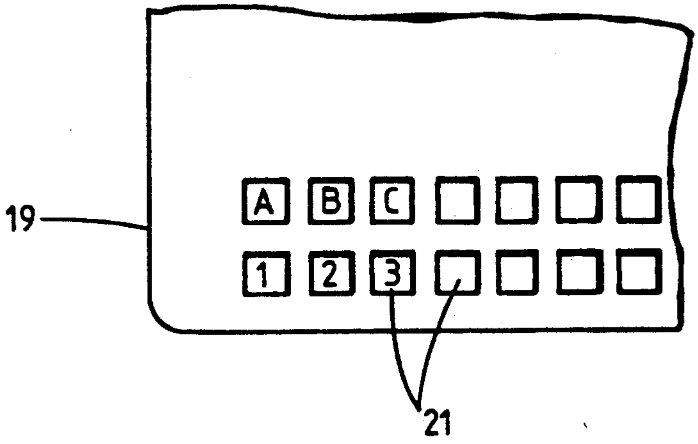
FIGS. 7, 9 and 10 show further embodiments.

FIG. 7 shows a further embodiment in which plateau 21 has only the size of one character 28 in each case and a plurality of plateaus are embossed in the card one beside the other. If this is reasonable in terms of process technology, the number of individual fields can also be adapted to the particular number of characters necessary for the card-individual writing.

Figure 8:
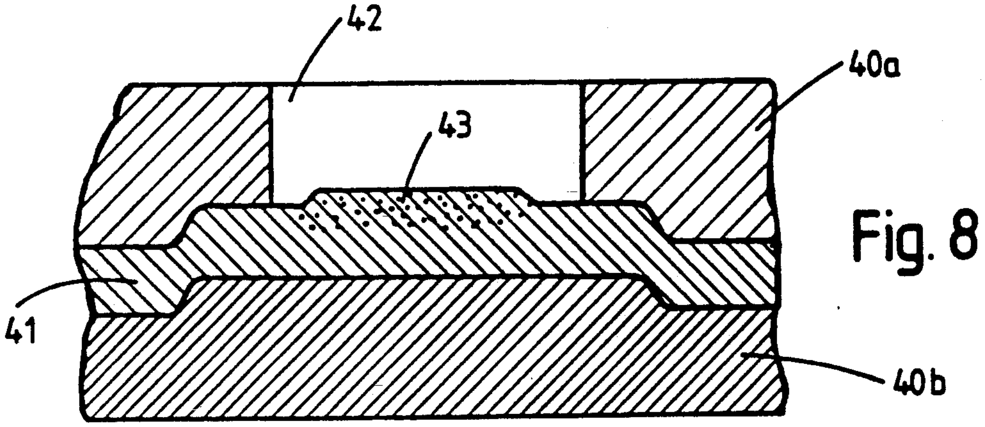
FIG. 8 shows a segment of the embossing apparatus.

The individual plateaus or the large-surface plateaus shown in the above examples can be obtained in many different ways. Preferred is an embossing method by which the plastic material of card 41 (FIG. 8) is softened by the action of a high-frequency electrical field and deformed by appropriate stamping molds. The stamping molds can directly be electrodes 40*a, b* for the electrical alternating field. Processing of PVC with the aid of high-frequency electrical alternating fields is known, for example, from the general expert literature.

This deformation technique has the advantage that the card is subject to thermal stress only in the areas that are actually deformed. Furthermore, this deformation is very difficult to form back since it is a deformation "with no memory," as opposed to mechanical cold forming. High frequency deformation also makes it possible to effect the plateau formation after forming the laser writing. Stamping die 40*a* has for this purpose a recess 42 in the card area bearing already lasered relief data 43, so that the mechanical effect of the stamping dies is concentrated on the edge areas of the plateau being formed. The lasered relief data are therefore not damaged during the embossing process, so that it is possible to effect the embossing after the laser writing. This solution thus has the further advantage that flat cards can be worked with during the laser writing, when the cards are automatically singled, transported and stacked.

Nevertheless, other embossing methods can also be used for forming the plateaus, if desired, for example the known cold forming or thermal deformation. Furthermore, it is also possible to effect an increase in the card surface in the embossed data area directly during lamination of the card. For this purpose matrices with the corresponding negative relief can be introduced between the card and the laminating plate. Since the matrix is the same for all cards here, as opposed to the teaching of German laid-open print no. 22 23 290, this does not involve an excessively elaborate intervention in the usual card production technology. Plateau formation during the laminating process also has the advantage that the back surface of the card remains flat in the total area and the printed pattern on the back is not disturbed by the embossing, as in the known cards.

The stamping dies used in the aforesaid deformation techniques may additionally have a relief in their surface, so that an embossed pattern (32, FIG. 5) is embossed into the card surface at the same time as the plateau formation. This embossed pattern may, for example, be a microrelief, a texture, a series of characters, logos or similar symbols. The card thus contains a further feature that makes it extremely difficult to imitate or change it, in particular if a self-contained pattern extends over the entire plateau area and is interrupted only by the lasered relief characters.

Figure 9:
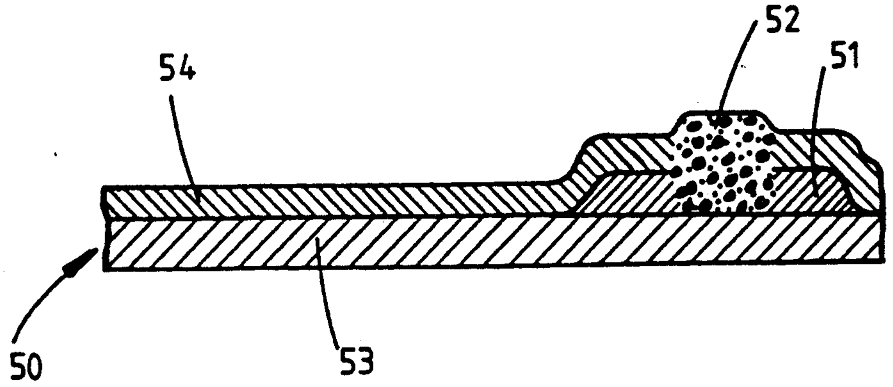

In a further embodiment (FIG. 9), multilayer card body 50 is provided with an additional piece of film 51 to form the plateaus in the embossed character area. This piece of film 51 embedded between core film 53 and cover film 54 may, for example, be a film made of the same transparent material as the inner cover film layer of the embodiment shown in FIG. 4 or 6. The card is thus increased in its thickness by about 0.3 to 0.4 mm in the necessary area. The formation of the characters with the relief structure then takes place as already described above by means of a laser beam, the increase in volume being effected by bubble formation in conjunction with a simultaneous discoloration in these transparent layers.

However, this additional piece of film 51 can also be glued to the outer surface of the finished card or welded onto the card. In this case it is recommendable to use the two-layer cover film structure shown in FIG. 4 as the material for this additional film. In order to prevent this piece of film from being subsequently replaced, one can control the laser beam in its intensity in such a way as to blacken the card core at least in its surface and make the user data recognizable on the card core layer as well.

Plateau formation by means of an additional piece of film has the advantage that the back of the card remains completely flat, so that a printed pattern located on the back of the card is not disturbed by embossing. Furthermore, the plateaus gain stability due to this flat back of the card.

Particularly in the case of large flat plateaus produced by one of the aforesaid methods with simultaneous formation of a negative relief on the back of the card, it may happen that the plateaus are pressed flat in the course of time by the mechanical stresses in the imprinter devices. The embossed data particularly in the central areas of the plateaus then no longer have the height necessary for producing a legible impression.

In order to counteract this sign of wear, the contact surface for the card in the imprinter devices could be provided with support elements or support structure which engage the cavities in the back of the card and support the plateaus during the printing operation. Preferably, however, the stamping dies or laminating plates lying against the back of the card are additionally equipped in the plateau area with depressions in the form of bores, channels, etc., into which the softened card material can flow during formation of the plateaus.

Figure 10:
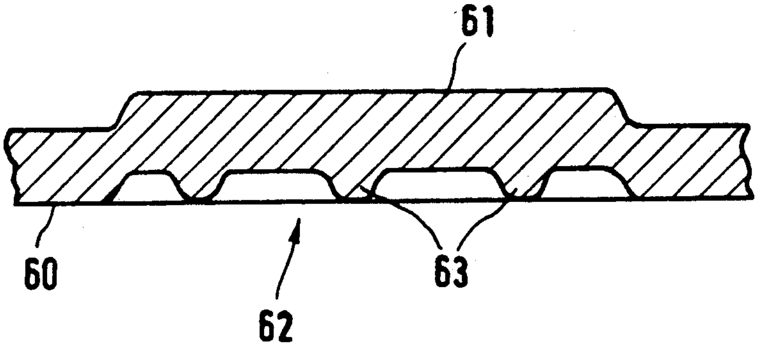

The structures in the form of knobs, support rails and other profiles that are formed by these depressions then serve to support and/or reinforce the plateau-like elevations from the back of the card. FIG. 10 shows schematically such a card 60 with a plateau-like elevation 61 on the front of the card which is supported on the back by a support profile 62 in the form of support rails 63 passing through the negative structure.

This effectively prevents the embossed data from being pressed flat during the service life of the card.

We claim:

1. A method of making an identity card including a card body having a card surface and at least one information character or symbol on said card surface raised a predetermined height above the card surface and useful as a printing block comprising the steps of:

forming at least one plastic surface area on the card body that is expandable locally upon exposure to laser beam irradiation;

forming a raised flat plateau surface area on said plastic surface area that is raised above the card surface to a predetermined elevation that is less than said predetermined height of the raised character and exposing the plastic surface area at least at an area corresponding at least in part with the flat plateau surface area to laser beam writing by a laser writer to locally expand the plastic surface area above the flat plateau surface area, so that the combined predetermined elevation of the plateau surface area and height of the plateau surface area exposed to laser beam writing and expanded by said writing provide said predetermined height to thereby produce said at least one character or symbol.

2. The method according to claim 1, wherein the step of forming said raised plateau surface area is carried out by local deformation of an area of the card body including the plastic surface area expandable by exposure to laser beam irradiation.

3. The method according to claim 1, wherein the step of forming said raised flat plateau surface area is carried out by forming the plastic surface area expandable by exposure to laser beam irradiation as a surface layer and bending the surface layer over a shaped underlying layer of material incorporated in the card body.

4. The method according to claim 2, wherein the local deformation is carried out by softening the card body in an embossing apparatus using a high frequency alternating electrical field and deforming the softened card body.

5. The method according to claim 4, including applying said electrical field to the card body by electrodes that are shaped to form cooperating stamping molds that produce the local deformation.

6. The method according to claim 5, including preheating at least one of the stamping molds before carrying out the local deformation.

7. The method according to claim 5, wherein the molds include a first mold part overlying a portion of the area subjected to local deformation including providing in at least the first mold part a recess arranged to prevent contact by the first mold part with the surface of the raised plateau surface area already produced by the local deformation and which contains a character or symbol formed prior to the local deformation.

8. The method according to any one of claims 1–7, wherein the laser writer used to irradiate and expand the plastic surface area to form said at least one character or symbol is operated in a pulsed mode, said laser writer using a pulse frequency and recording speed selected such that successive pulses overlap locally at least partially over the plastic surface area.

9. The method according to claim 8, including laser writing on the card body over an area of the card surface including the plastic layer expandable by laser irradiation outside the raised plateau surface area without forming a relief effect on surface outside the plateau surface area by directing the laser beam over the said card surface outside the plateau surface area in nonoverlapping fashion thereby producing a lower intensity exposure of the card body outside the raised plateau surface area to laser beam energy.

10. The method according to claim 8, wherein the laser writing is applied by scanning the card in dot-by-dot fashion.

11. The method according to claim 8, wherein the laser writing is applied by scanning the card in line-by-line fashion.

12. The method according to claim 1, wherein the step forming the raised flat plateau surface raised to the predetermined elevation is carried out before the step of exposing the plastic surface area corresponding at least in part with the flat plateau surface area to laser beam writing.

13. The method according to claim 1, wherein the step of exposing the plastic surface area at least at the area corresponding at least in part with the flat plateau surface area is carried out before the step of forming the raised flat plateau surface area on said plastic surface area that is raised above the card surface to the predetermined elevation.

* * * * *